Patented June 4, 1935

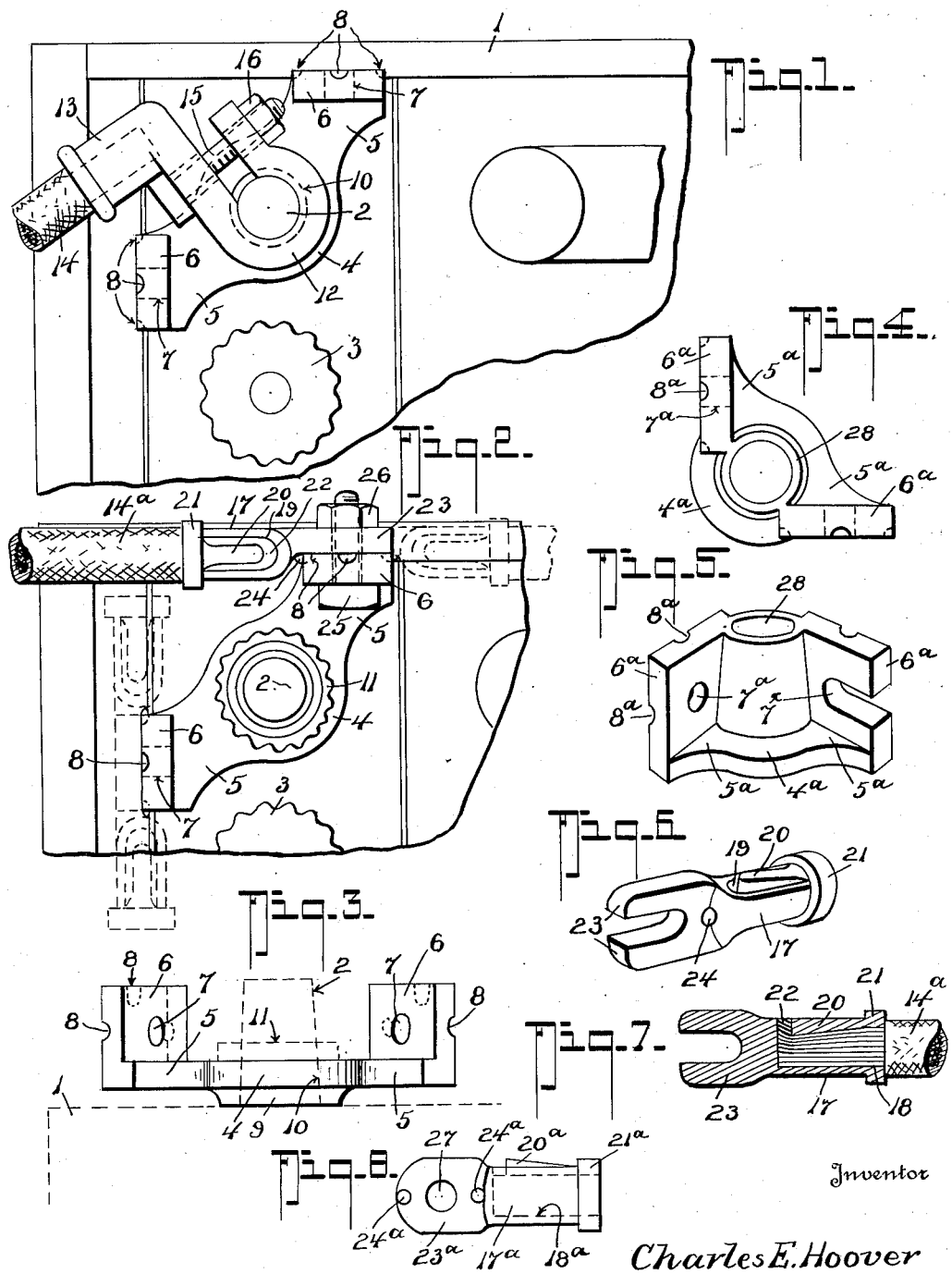

2,004,049

UNITED STATES PATENT OFFICE 2,004,049

MEANS FOR CONNECTING CABLES TO BATTERIES

Charles E. Hoover, Lancaster, Pa.

Application June 8, 1933, Serial No. 674,955

4 Claims. (Cl. 173—259)

My invention has for its primary object to reduce the service necessary in removing and replacing storage batteries from and to motor cars, etc., when it becomes necessary to recharge or repair the batteries.

A further object is to provide a universal angle post that may be permanently attached to any regular or standard storage battery terminal-post whereby either the old battery battery cable clamp or a new battery cable terminal of my invention may be used accordingly as the car being serviced is equipped with the old-style clamp-terminal or the new cable terminal of my invention, without the slightest interference of the one system with the other.

Further it is an object to provide a means of the kind referred to whereby the cable may be attached to the terminal-post so as to protect horizontally in any one of four different directions to accommodate any different position of the cable to starter switch or to ground, as the case may be.

Further it is an object to so design the improved terminal-post bracket that the bolt which passes through its lugs will be held from turning while the nut is being turned, thus necessitating the use of but a single wrench.

Further it is an object to provide a battery cable terminal and a battery post terminal of such cooperative constructions that it will not be necessary to run the nut entirely off the bolt in order to disconnect or connect the terminal from or to the post.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a plan view of a portion of a battery with my improved terminal-post applied but showing it in use with an ordinary split-clamp type of cable terminal.

Figure 2 is a plan view of a portion of a battery employing my invention completely.

Figure 3 is an elevation of the battery terminal-post of my invention.

Figure 4 is a plan view of another embodiment of my invention.

Figure 5 is a perspective view of the embodiment of the invention shown in Figure 4.

Figure 6 is a perspective view of one of my new and improved cable terminals.

Figure 7 is a vertical, longitudinal section of the same with the cable attached.

Figure 8 is an elevation of another embodiment of my cable terminal invention.

In the drawing in which like numerals and letters of reference designate like parts in all the figures, 1 represents an ordinary storage battery such as is now universally used in motor vehicles. 2 indicates one of the terminal-posts thereof and 3 represents one of the filler caps.

My present invention, adapted as a universal terminal-post, comprises a base 4 having arms 5 with upstanding flat lugs 6 at their ends, the lugs being spaced a considerable distance from the center of the base and being located in planes preferably at right angles to one another. The lugs 6 have suitably positioned bolt holes 7 so disposed with respect to the distance above the base arms 5 that the head 25 of a bolt passed through the lug will be held against turning (see Figure 2).

The lugs 6 are provided with recesses 8—8 which are spaced equidistant around the holes 7 and at angles of ninety degrees apart for a purpose which will later be made clear.

Beneath the base proper 4 and centrally thereof is a boss 9. The boss and the base are apertured at 10 to fit snugly over the ordinary battery terminal-post 2, after removal of the lock-nut 11, and are secured by said nut, as well as by soldering or sweating the parts together as a permanent structure. The battery-post 2 is left to project above the base 4 to receive the split clamp of the cable terminal. As the lugs 6 are spaced widely apart and at a sufficient distance from the terminal-post 2, the usual split-clamp type cable terminal may be directly clamped to the post 2 when a battery that has my improved terminal on it is used to replace one having the old-style equipment. When, however, the cables are equipped with my new and improved terminals, (see Figures 2, 6, 7 and 8), the coupling of the terminal is made to a lug 6, as will later be explained.

The ordinary split-clamp type cable terminal, as will be seen by reference to Figure 1, comprises a socket 13 into which the end of the cable 14 is soldered. It also includes the split clamp proper 12 and the clamp screw 15 with a nut 16.

When a battery is supplied in a new car equipped with my improved cable terminals it may be provided with battery terminals constructed as shown in Figures 4 and 5, by reference to which it will be observed that the base 4a has an upstanding sleeve 28 to fit tightly over the post 2 to which it is permanently secured by sweating or soldering.

The lugs 6a are integral with the arms 5a and with the sleeve 28, and are located relatively close together since the battery equipped with this terminal is not to be used with a split-clamp type of cable terminals. Those parts in Figures 4 and 5 which correspond in purpose and function to similar parts in Figure 1 bear the same reference numerals plus the index letter "a", so a further description thereof is thought to be unnecessary.

In Figures 6 to 8 inclusive, I have illustrated a new and improved cable terminal which, when taken with my improved battery terminal, completes the set comprising my invention.

This cable terminal comprises a tubular shank 17 having a collar 21 at one end and a flat coupling member 23 at the other end, the latter member being preferably forked to slip over the clamp bolt 25 (see Figure 2) without removing the nut therefrom, although it may be made with a simple hole 27 if desired. The tubular portion 17 is open as at 19 and in this opening is provided a tongue 20 that is integral with the collar 21 and is of a greater depth or thickness at its free end than at its secured end so that it may be hammered down into the socket 18 to clamp and bite into the strands of the cable 14a (see Figure 7), leaving a space around the tongue into which the solder may be introduced for soldering the cable end into the socket to hold the tongue against being bent back by a pull on the cable and for the purpose of filling up the opening 19 to prevent acid working into the same. Acid is prevented from working into the socket 18 from the end of the same because of the tight contact made between the insulation 14a and collar 21 when the strands of the cable are forced into the socket 18. When the cable 14a has had its strands inserted into the socket and the tongue 20 has been hammered down, melted solder is run into the socket through the opening 19 and not only solders the strands together and to the tubular portion 17, but also closes the hole 19 and prevents acid and moisture from entering the socket, as stated before.

There is also provided on the cable terminal a nib or protuberance 24 to fit one or another of the recesses 8 and prevent swiveling of the cable terminal on the bolt 25 when the nut 26 has been screwed home.

When the simple apertured end 23a is provided the nib 24a may be located at the extreme end or at the inner end, or both places (as shown in Figure 8). Those parts in Figure 8 which correspond in purpose and function to similar parts in Figures 6 and 7 bear the same reference numeral plus the index "a", and a detailed description of Figure 8 is therefore thought to be unnecessary.

From the foregoing it will be seen that the angular relation between the lugs 6—6, or 6a—6a etc., permits the cable terminal end to be quickly attached by slipping the slotted end 23 between the nut and the lug, and tightening up the nut finishes the job. To remove the cable terminal one simply loosens the nut and slips the terminal off.

My invention eliminates all the work and annoyance incident to the use of the clamp-type connector and reduces service to a minimum, as well as rendering the work of battery changing more pleasant than heretofore.

The bolt openings 7 may comprise simple holes, as shown in Figures 1 to 3, inclusive, or slots 7x, as shown in Figure 5 may be used if desired.

Other advantages of my invention will be clear to those skilled in the art, and while I have illustrated preferred embodiments of the invention it is obvious that changes in the details of construction, arrangement and combination of parts may be made without departing from the spirit of the invention or the scope of the appended claims.

What I claim is:

1. A battery terminal connector comprising a base having an opening to fit over a battery-post and be secured thereto, a pair of lugs carried by and upstanding from the base and located at right angles to one another, said lugs having bolt holes, said lugs being spaced from said opening a distance sufficient to permit the placing of a clamp cable terminal over the base for register with the opening without contacting the lugs.

2. In combination, a battery terminal connector comprising a base having arms and upstanding lugs on said arms, said lugs being widely spaced apart, a battery terminal post, said base being apertured and being fitted over said battery terminal-post and secured thereto with the post projecting up through the base, and a split-clamp type cable terminal located between said lugs and secured to said terminal post, each of said lugs having a bolt hole.

3. The combination with a battery post, a terminal connector comprising a base plate having an aperture to fit over the battery post, said plate having a pair of laterally projecting portions each carrying upstanding lugs, said lugs being located at right angles to one another and having bolt holes and flat faces, and means for securing said plate to the battery post, substantially as described.

4. In combination with a battery post, a terminal connecter comprising a base plate having an aperture and having an upstanding sleeve registering with said aperture to fit over and be secured to the battery post, said connecter including a pair of flat lugs upstanding from the base and integral with the sleeve, the lugs being positioned at approximately right angles to one another, and each being apertured to receive a coupling bolt, substantially as shown and described.

CHARLES E. HOOVER.